United States Patent

[11] 3,577,083

[72] Inventor James S. Adams
Batesville, Ind.
[21] Appl. No. 750,079
[22] Filed Aug. 5, 1968
[45] Patented May 4, 1971
[73] Assignee The Magnavox Company
Ft. Wayne, Ind.

[54] MODIFIED LATCH CIRCUIT SPECIFICALLY FOR SEARCH TUNING ARRANGEMENT

10 Claims, 1 Drawing Fig.

[52] U.S. Cl. .......... 325/471, 178/6, 334/22, 334/25
[51] Int. Cl. .......... H04b 1/32
[50] Field of Search .......... 325/470, 471; 334/10, 20, 21, 22, 24, 25; 178/6 (Tuning)

[56] References Cited
UNITED STATES PATENTS
3,448,386 6/1969 Buhr .......... 325/471
3,456,197 7/1969 Schulz .......... 325/470X

*Primary Examiner*—Richard Murray
*Assistant Examiner*—R. J. Bell
*Attorney*—Richard T. Seeger

ABSTRACT: A latch circuit is provided for a reversible motor, particularly for a search tuning motor on a television set, in which a relay is provided for each direction of rotation of the reversible motor and which relays can be energized manually or by remote control, and a holding circuit is provided for each relay comprising the collector-emitter circuit of a pair of serially arranged transistors, the second transistor in each pair of serially arranged transistors being the same transistor and being normally nonconductive and becoming conductive upon energization of the motor to run in either direction. The energization circuit to the motor is deenergized when the motor reaches a predetermined position and this also interrupts the holding circuit which is at that time effective.

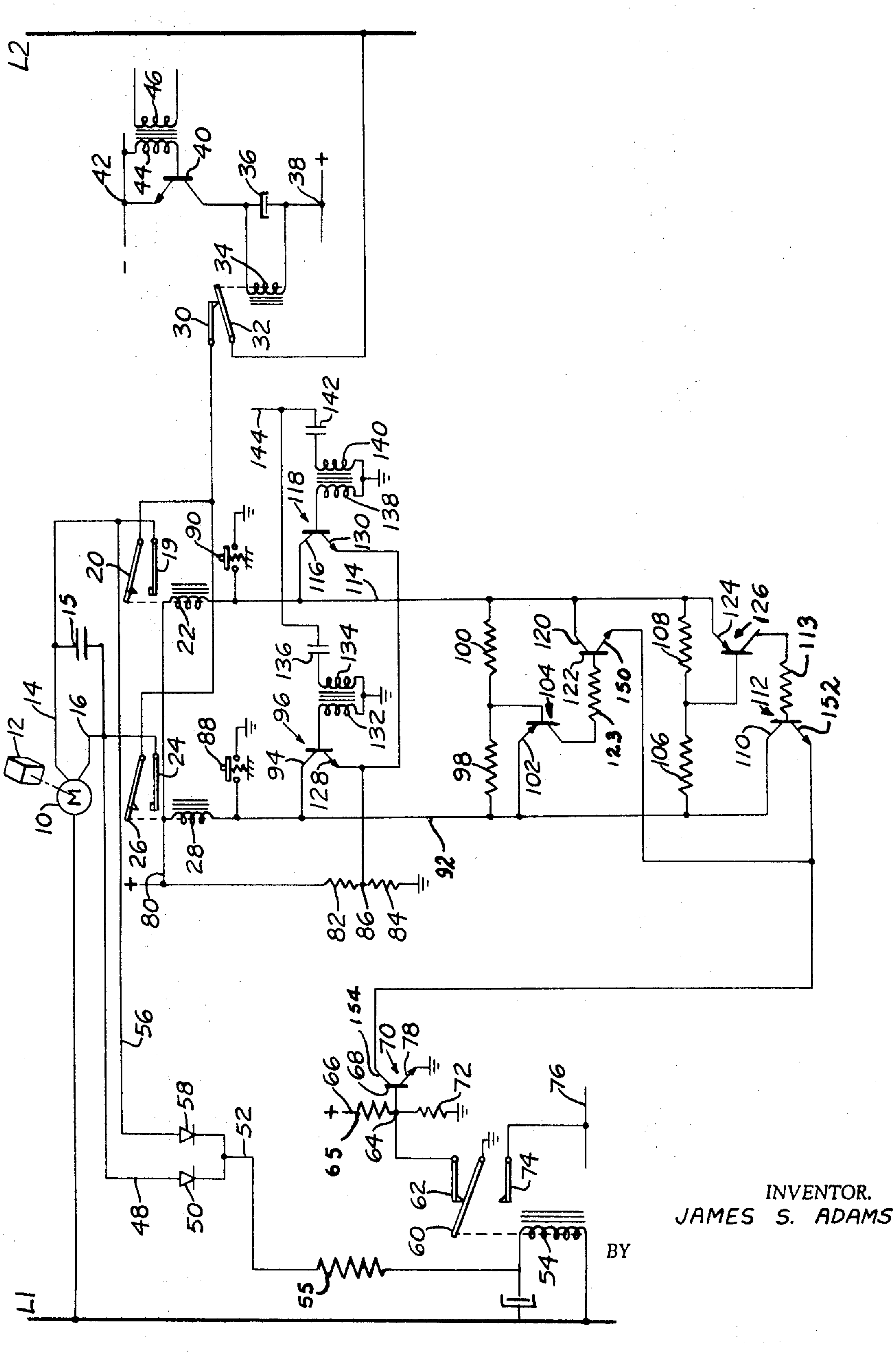
INVENTOR.
JAMES S. ADAMS
BY

MODIFIED LATCH CIRCUIT SPECIFICALLY FOR SEARCH TUNING ARRANGEMENT

This invention relates to electric circuits and is particularly concerned by a novel latching circuit for latching relays in energized position.

A particular instance in which a circuit of the nature referred to, and in connection with which the circuit of the present invention is illustrated; is a remote-controlled tuning arrangement for a television set, or the like. Such arrangements embody a reversible tuning motor which is under the control of relays so that the motor can turn in one direction or the other and the motor ordinarily remains running, once it is energized, until it comes to a preset position or until the television set is receiving a strong signal from a station. In any case, once the motor is energized by operation of the remote operator it is desired for it to remain energized until it has adjusted the tuning device of the set to a certain position. Normally, remote operators of the nature referred to will only effect energization of the relay momentarily so that a holding or latching arrangement must be provided to hold the relays in to maintain energization of the motor. Such latching circuits must be low drain and must be relatively inexpensive and must prevent interference with the television set and must be certain in operation.

With the foregoing in mind, the present invention has as its primary objective the provision of a novel latch circuit for the control relays of a reversible motor which is simple, inexpensive and effective in operation.

Another object of this invention is the provision of a latch circuit for the tuning motor of a remote-controlled turning device in which the latch circuit embodies transistors and is thus free of contacts and armatures and other movable parts.

A still further object of this invention is the provision, in combination with a latch circuit of the nature referred to, of a control relay in connection therewith which serves a double purpose in a television set embodying the latch circuit.

The foregoing objects as well as still other objects and advantages of the present invention will become more apparent upon reference to the following detailed specification taken in connection with the accompanying drawing which is a schematic representation of a latch circuit according to the present invention.

Referring to the drawing somewhat more in detail, motor 10 is a reversible motor and is connected with a tuning arrangement generally designated at 12 and which may be, for example, the ultrahigh-frequency tuner of a television set.

One side of motor 10 is connected by a single wire to the power line L1 of the pair of power lines L1 and L2, the other side of the motor has two wires 14 and 16 connected thereto with a phase shift capacitor 15 connected between these wires, as is well known in the art. When current is supplied to motor 10 via wire 14, motor 10 turns in one direction and when current is supplied to motor 10 via wire 16, motor 10 turns in the opposite direction. Wire 14 is connected to the stationary blade 19 of a relay which has a normally open movable blade 20 adapted to close on blade 19 when the actuating coil 22 of the relay is energized.

Similarly, wire 16 leads to the stationary blade 24 of a relay which has a normally open movable blade 26 that is adapted to close on blade 24 in response to energization of the actuating coil 28 of the relay.

Blades 20 and 26 of the relays are connected together and to the stationary blade 30 of still another relay which has a movable blade 32 which is normally closed on blade 30 and which is adapted to move away from blade 30 upon energization of the actuating coil 34 of the relay. Movable blade 32 is connected to the other power line L2. Power lines L1 and L2 may be regular house current at, say, 120 volts, whereas the voltage supply to actuating coils 22 and 28 is at low voltage, say, 15 volts.

Coil 34 is connected in parallel with a condenser 36 and one side of the coil is also connected to the plus voltage supply at 38 while the other side of the coil is connected via the collector-emitter circuit of an NPN transistor 40 with a negative voltage point 42. The base of transistor 40 is connected to the emitter thereof via a coil 44 which is magnetically coupled with another coil 46 in which a signal is supplied from the television set in a manner known in the art. When the signal to coil 46 reaches a certain magnitude, transistor 40 becomes conductive and the relay blade 32 will move downwardly. This downward movement will be momentary but will be sufficient to interrupt the source of power to motor 10 and, as will be seen hereinafter, will cause the energizing circuit to the motor to be opened.

Wire 16 has connected thereto a wire 48 that leads through a diode 50 to a wire 52 which is connected through resistor 55 to one end of a relay coil 54, the other side of which is connected with power line L1.

Similarly, wire 14 leading to motor 10, has connected thereto a wire 56 which is connected to diode 58 and which diode 58 is also connected to wire 52. By the described arrangement, wires 48 and 56 are electrically isolated from each other because of diodes 50 and 58 but anytime either of wires 14 or 16 is energized, coil 54 will be energized and will pull its movable blade 60 downwardly. When coil 54 is deenergized blade 60 closes on blade 62, which is connected at point 64 to one end of resistor 65, the other end of which connects to wire 66 leading to a plus voltage supply. Point 64 is also connected through a resistor 72 to the ground, and to the base 68 of an NPN transistor 70.

When blade 60 is moved downwardly by energization of its coil 54, it closes on a blade 74 which is connected to a wire 76 that represents the audio circuit of the television set. Thus, when coil 54 is energized blade 60 is pulled downwardly and is in electrical contact with wire 76. As will be seen, blade 60 is grounded so that when it is closed on blade 74 the audio circuit of the television set is grounded out and the television set makes no sound.

On the other hand, when coil 54 is deenergized, blade 60 is closed on blade 62 and this grounds point 64 so that the base 68 of transistor 70 is at the same potential as emitter 78 of the transistor and the transistor is nonconductive. When, however, the blade 60 moves away from blade 62, the base 68 of transistor 70 will go positive relative to emitter 78 because of current flow through resistor 65, and the transistor will become conductive.

Turning now to the latch circuit forming the primary novelty of the present invention, each of coils 22 and 28 has one end connected with a wire 80 leading to a plus voltage source, say, plus 15 volts. Wire 80 is also connected through the serially arranged resistors 82 and 84 with ground. Wire 80 can be considered one terminal of the voltage source for actuating coils 22 and 28 while ground, or point 86 between resistors 82 and 84 can be considered as the other terminal. Resistor 84 is substantially smaller than resistor 82 so that point 86 is only a fraction of a volt above the ground level.

A manual switch 88 is connected between the side of coil 28 opposite wire 80 and ground while another normally open manual switch 90 is similarly connected between the corresponding end of coil 22 and ground. Closing of either of switches 88 or 90 will cause energization of the respective actuating coil.

The side of coil 28 opposite wire 80 is also connected to a wire 92 that is connected to the collector 94 of an NPN transistor 96. Wire 92 is also connected to one end of a resistance branch having serially arranged therein resistors 98 and 100. Wire 92 is also connected to emitter 102 of a PNP transistor 104; is further connected to one end of another resistance branch having serially arranged therein resistors 106 and 108 and, finally; is connected with the collector 110 of an NPN transistor 112.

The side of coil 22 opposite wire 80 is similarly connected to a wire 114 which is connected to collector 116 of an NPN transistor 118; to the end of the resistance branch containing resistors 98 and 100 opposite wire 92; to the collector 120 of an NPN transistor 122; to the end of the resistance branch-containing resistors 106 and 108 opposite wire 92 and, finally; to the emitter 124 of a PNP transistor 126.

The point 86 previously referred to as being only slightly above ground level is connected to the emitter 128 of transistor 96 and to the emitter 130 of transistor 118. Each of transistors 96 and 118 is normally nonconductive. The base of transistor 96 is connected to one end of a coil 132 the other end of which is connected to ground. Coil 132 is magnetically coupled to another coil 134 which is in series with a capacitor 136.

The base of transistor 118 is connected to one end of a coil 138 the other end of which is grounded. Coil 138 is magnetically coupled to another coil 140 which is in series with a capacitor 142. The sides of capacitors 136 and 142 opposite the respective coils are connected together and to a wire 144 which leads to a source of signals. Each of the coil-capacitor combinations responds to a respective signal frequency so that signals supplied by one and the same wire 144 cause current flow in coil 134 and 140 thereby to create an AC voltage in their magnetically coupled coils 132 and 138 thereby to make transistors 96 and 118 selectively momentarily conductive. It will be appreciated that whenever one of transistors 96 and 118 is made conductive the pertaining actuating coil 28, 22 will be energized the same as if the respective one of switches 88 or 90 had been closed.

The base of transistor 104 is connected to the juncture of resistors 98 and 100 and the base of transistor 126 is connected to the juncture of resistors 106 and 108. Resistors 98 and 108 are substantially smaller than resistors 100 and 106.

Emitter 150 of transistor 122 and emitter 152 of transistor 112 are connected together and to collector 154 of transistor 70.

The above described latch circuit operates in the following manner:

At rest, the potential of each of wires 92 and 114 is the same as that of wire 80, say, about plus 15 volts. Blade 32 is closed on blade 30 and blade 60 is closed on blade 62. All of transistors 104, 112, 122, 126, and 70 are in a nonconductive state, and transistors 96 and 118 are also in a nonconductive state.

If, now, a signal is supplied to wire 144 of a frequency corresponding to one of the resonant frequencies of the coil-capacitor combination 134, 136, 140, 142, a voltage will be developed in the pertaining one of coils 132, 138 and the respective transistor 96 or 118 will be made conductive.

Assuming it is transistor 96 which is made conductive, the respective actuating coil 28 will be energized and its blade 26 will close on blade 24. Motor 10 will be energized by current flowing between L1 and L2 via wire 16, blades 24 and 26, and blades 30 and 32 and through the motor.

Also, wire 48 and diode 50 will supply current to coil 54 through resistor 55 and blade 60 will close on blade 74. When blade 60 leaves blade 62, transistor 70 is biased to conduction due to the voltage across resistor 72, and when blade 60 closes on blade 74, wire 76 is grounded and the audio circuit of the television set is muted.

When transistor 96 becomes conductive, the potential of wire 92 goes to near zero so current will flow from wire 114 through resistance branches 98, 100 and 106, 108 to wire 92. The current through resistance branch 98, 100 is not effective because it merely makes the base of PNP transistor 104 even more positive relative to the emitter thereof. The current flow in branch 106, 108, however, makes the base of PNP transistor 126 negative relative to the emitter thereof and transistor 126 is, thus, driven to conduction.

When transistor 126 conducts, the base of NPN transistor 112 is made positive because of its connection to the collector of transistor 126 through resistor 113. With transistor 70 conductive and with transistor 112 conductive, wire 92 is connected via the said transistor to ground so coil 28 will remain actuated.

When the signal to coil 46 is such as to develop a pulse in coil 44, transistor 40 will go conductive and coil 34 will momentarily move blade 32 away from blade 30 and interrupt the continuity of the circuit to motor 10.

Also, line L2 is cut off from coil 54 and coil 54 is thereby deenergized and releases blade 60 to come on blade 62. When blade 60 closes on blade 62, transistor 70 becomes nonconductive because of elimination of the bias from the emitter to the base. With transistor 70 nonconductive, current flow in wire 92 ceases; actuating coil 28 is deenergized to release blade 26 so it will leave blade 24; and transistors 112 and 126 lose their bias and go nonconductive.

The latch circuit is now restored to idle condition.

When transistor 118 is actuated, instead of transistor 96, exactly the same cycle occurs except that coil 22 is energized to close blade 20 on blade 18 and motor 10 runs in the opposite direction. Also, transistors 104 and 122 become conductive to connect wire 114 to ground via transistor 70 instead of transistor 112 and 126 becoming conductive as first described.

It will be appreciated that modifications can be made in the arrangement illustrated and described without departing from the spirit of the invention. For example, resistance branches 98, 100 and 106, 108 could be combined in a single branch having three serially arranged resistors with two smaller resistors on the ends and a larger resistor in the center and with the bases of transistors 104 and 126 connected to respectively opposite ends of the larger resistor.

Also, the latch circuit described is made operable by closing of either of switches 88, 90, which may be located directly on the television set.

The system according to the present invention can operate when the driven tuner reaches a certain position by utilizing a switch arrangement that will deliver a pulse to coil 46 when the tuner reaches certain predetermined positions, or the signal to coil 46 can be supplied when the tuner reaches the point that a station is tuned in. Such signal development is well known in the art of search tuners and remote-controlled tuners and forms no part of the present invention except in the claimed combination.

It will be understood that only one modification of the circuit is illustrated in the drawing and that other modifications and adaptations thereof falling within the scope of the appended claims will occur to those skilled in the art.

I claim:

1. In an electric circuit; a reversible motor, a source of energy for energizing the motor, first and second relays in circuit with said motor each operable when closed to cause rotation of the motor in a respective direction, each relay having an actuating coil, a source of voltage having one terminal connected to one end of each actuating coil, switch means for each coil operable for momentarily selectively connecting the other end of the pertaining actuating coil to the other terminal of said source of voltage to energize the coils, a latch circuit comprising a first branch leading to said other end of one of said actuating coils and a second branch leading to said other end of the other of said actuating coils and a third branch connected between said other terminal of said source of voltage and the ends of the first and second branches which are connected to said actuating coils, said branches being interconnected and being normally nonconductive, first means responsive to closing of a said switch means for making the said branch leading to the pertaining said actuating coil conductive, second means responsive to the supply of energy to said motor when the relay of the said actuating coil closes to make said third branch conductive, and third means operable for interrupting the supply of energy to said motor to halt said motor and make said third branch nonconductive whereupon the energized one of said actuating coils will be deenergized and its pertaining said branch will also become nonconductive.

2. An electric circuit according to claim 1 in which each said first and second branch includes the collector-emitter circuit of a normally nonconductive first transistor, and said first means comprises a normally nonconductive second transistor for controlling each first transistor and having its collector-emitter circuit connected between the base of the respective said first transistor and the branch pertaining to the other said first transistor, and bias network means extending between said branches and having points thereon connected to the bases of said second transistors, each second transistor being biased to conduction in response to the closing of a said switch means pertaining to the actuating coil in the branch in which the first transistor which is under the control of the respective said second transistor is located, each second transistor when conductive biasing the pertaining first transistor to conduction.

3. An electric circuit according to claim 1 in which said third branch includes the collector-emitter circuit of a third transistor, and said second means comprises a third relay operable when deenergized to make said third transistor non-conductive and when energized to make said third transistor conductive, and means for energizing said third relay in response to the supply of energy to said motor upon energization of either of said first and second relays.

4. An electric circuit according to claim 1 in which said third means comprises a fourth relay operable when energized to interrupt the energizing circuit to said motor and when deenergized to establish the energizing circuit to said motor, a device driven by the motor.

5. An electric circuit according to claim 2 in which said third branch includes the collector-emitter circuit of a third transistor, and said second means comprises a third relay operable when deenergized to make said third transistor non-conductive and when energized to make said third transistor conductive, and means for energizing said third relay in response to the supply of energy to said motor upon energization of either of said first and second relays.

6. An electric circuit according to claim 5 in which said third means comprises a fourth relay operable when energized to interrupt the energizing circuit to said motor and when deenergized to establish the energizing circuits to said motor, a device driven by the motor.

7. An electric circuit according to claim 2 in which said one terminal of said source of voltage is positive relative to the said other terminal thereof, and said first transistors are NPN transistors and said second transistors are PNP transistors.

8. An electric circuit according to claim 3 in which said motor is connected to the tuner of a television set having an audio circuit and said third relay when energized connecting said audio circuit to ground to mute the audio output of the set during tuning.

9. An electric circuit according to claim 1 in which said switch means for each actuating coil includes a normally non-conductive fourth transistor, and means for selectively supplying bias pulses to the bases of said fourth transistors to make the transistors conductive.

10. An electric circuit according to claim 9 in which said means for supplying bias pulses to the bases of said fourth transistors comprises a first coil connected to each base, a second coil magnetically coupled to each first coil, a capacitor in series with each second coil, each second coil and its series capacitor having a respective resonant frequency, and a signal wire leading to said second coils via said capacitors for supplying signals thereto so that one only of said fourth transistors can be made conductive by a given signal.